United States Patent
Suthar et al.

(10) Patent No.: US 9,854,408 B2
(45) Date of Patent: Dec. 26, 2017

(54) DEPLOYING CELL ON DRONE OR DRONEAP TO MITIGATE RADIO CAPACITY AND COVERAGE ISSUES

(71) Applicant: Cisco Technology, Inc., San Jose, CA (US)

(72) Inventors: Om Prakash Suthar, Naperville, IL (US); Baljit Singh, Cumming, GA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 15/046,691

(22) Filed: Feb. 18, 2016

(65) Prior Publication Data
US 2017/0013476 A1 Jan. 12, 2017

Related U.S. Application Data

(60) Provisional application No. 62/191,080, filed on Jul. 10, 2015.

(51) Int. Cl.
*H04B 17/00* (2015.01)
*H04W 4/04* (2009.01)
(Continued)

(52) U.S. Cl.
CPC .......... *H04W 4/04* (2013.01); *H04B 7/18506* (2013.01); *H04L 43/16* (2013.01);
(Continued)

(58) Field of Classification Search
CPC ... H04W 24/02; H04W 28/0289; H04W 4/02; H04W 84/18; H04W 48/16;
(Continued)

(56) References Cited

U.S. PATENT DOCUMENTS 6,141,565 A 10/2000 Feuerstein et al.
6,842,674 B2 1/2005 Solomon
(Continued)

FOREIGN PATENT DOCUMENTS

EP 2290491 A2 3/2011
WO 2015031238 A1 3/2015

OTHER PUBLICATIONS

International Search Report for PCT/US2016/041805 dated Sep. 29, 2016.
(Continued)

*Primary Examiner* — Ajibola Akinyemi
(74) *Attorney, Agent, or Firm* — Patterson + Sheridan, LLP (57) ABSTRACT

Embodiments herein describe a system that includes an autonomous vehicle (referred to herein as a drone) which is controlled by a self-organizing network (SON) to expand the capabilities of a cellular network in real time. In one embodiment, the SON monitors the cellular network and identifies congestion or capacity issues where the cell towers covering the geographic region may be unable to satisfy the large number of requests for data by the users in the region. Once a congestion or capacity issue is detected, the SON determines whether dispatching a drone access point (AP) may improve or resolve the issue. In one example, the drone AP is an autonomous vehicle that includes a radio that permits the drone to serve as a mobile cell site for the cellular network.

20 Claims, 5 Drawing Sheets

(51) Int. Cl.

| | | |
|---|---|---|
| H04W 24/02 | (2009.01) | |
| H04B 7/185 | (2006.01) | |
| H04W 24/08 | (2009.01) | |
| H04W 4/02 | (2009.01) | |
| H04W 28/02 | (2009.01) | |
| H04L 12/26 | (2006.01) | |
| H04W 72/04 | (2009.01) | |
| H04W 24/10 | (2009.01) | |
| H04W 84/18 | (2009.01) | |

(52) U.S. Cl.
CPC .............. *H04W 4/02* (2013.01); *H04W 24/02* (2013.01); *H04W 24/08* (2013.01); *H04W 28/0289* (2013.01); *H04W 72/048* (2013.01); *H04W 24/10* (2013.01); *H04W 84/18* (2013.01)

(58) Field of Classification Search
CPC . H04W 36/0005; H04W 36/30; H04W 48/04; H04W 4/021; H04W 4/023; H04W 64/006; H04W 84/005; H04W 84/06; H04W 88/16; H04W 16/14; H04W 24/08; H04W 24/10; H04W 4/005; H04W 4/04
USPC ........................................................ 455/67.1
See application file for complete search history.

(56) References Cited

U.S. PATENT DOCUMENTS

| 7,415,313 | B2 | 8/2008 | Brueckner et al. | |
|---|---|---|---|---|
| 8,989,922 | B2 | 3/2015 | Jones et al. | |
| 9,363,690 | B1 | 6/2016 | Singh et al. | |
| 2003/0164794 | A1* | 9/2003 | Haynes | H04B 1/7172 342/353 |
| 2012/0106356 | A1 | 5/2012 | Johansson et al. | |
| 2015/0078344 | A1 | 3/2015 | Futaki et al. | |
| 2015/0140954 | A1 | 5/2015 | Maier et al. | |
| 2015/0236778 | A1 | 8/2015 | Jalali | |
| 2015/0312774 | A1 | 10/2015 | Lau | |
| 2015/0353195 | A1 | 12/2015 | Peeters et al. | |
| 2015/0356482 | A1 | 12/2015 | Whipple et al. | |
| 2016/0040902 | A1 | 2/2016 | Shah | |
| 2016/0191142 | A1* | 6/2016 | Boss | H04W 84/06 455/405 |

OTHER PUBLICATIONS

Nokia Networks, du first in UAE to use telco drones for better network planning & faster optimization, Jul. 7, 2015, retrieved Sep. 10, 2015, 5 pages, Nokia Solutions and Networks, <http://networks.nokia.com/news-events/press-room/press-releases/nokia-networks-dukst-in-uae-to-use-telco-drones-for-better-network-planning-faster-opti>.

Brown, Mark, Kinect-carrying drone automatically builds 3D maps of rooms, wired.co.uk, Mar. 31, 2011, <http://www.wired.co.uk/news/archive/2011-03/31/kinect-drone>.

Smith, Brett, Drones Help Create Detailed Maps of Coral Reefs, redOrbit: Your Universe Online, Oct. 16, 2013, <http://www.redorbit.com/news/science/1112976710/drones-help-create-detailed-maps-of-coral-reefs/>.

Turk, Victoria, Drones Mapped the Philippines to Improve Typhoon Aid Efforts, Motherboard, May 9, 2014, <http://motherboard.vice.com/read/drones-mapped-the-philippines-to-improve-typhoon-aid-efforts>.

Intel and Cisco: Collaborative Testing of a Media-Ready WLAN Solution: Executive Summary, White Paper, pp. 1-6, 2011, Intel Corporation, Santa Clara, United States.

Churchill, Sam, UAVs: Flying Cell Towers, dailywireless.org, Nov. 19, 2012, 7 pages, <http://www.dailywireless.org/2012/11/19/uays-flying-cell-towers/>.

Popper, Ben, Google says its Titan drones will make their first flight in a few months, The Verge, Mar. 2, 2015, 3 pages, <http://www.theverge.com/2015/3/2/8131145/googles-titan-drone-flight-internet-access>.

Jones, Dan, Here Come the WiFi Drones, LightReading: Netowrking the Communications Industry, Nov. 11, 2013, 6 pages, <http://www.lightreading.com/iot/drones/here-come-the-wifi-drones/d/d-id/706525>.

Jackson, Donny, Motorola Solutions: Alan Conrad demonstrates prototype handheld LTE eNodeB/EPC, drone application, Urgent Communications, Apr. 23, 2015, 4 pages, <http://urgentcomm.com/motorola-solutions/motorola-solutions-alan-conrad-demonstrates-prototype-handheld-lte-enodebepc-dron>.

* cited by examiner

DEPLOYING CELL ON DRONE OR DRONEAP TO MITIGATE RADIO CAPACITY AND COVERAGE ISSUES

CROSS-REFERENCE TO RELATED APPLICATIONS

This application claims benefit of U.S. Provisional Patent Application Ser. No. 62/191,080, filed Jul. 10, 2015, which is incorporated by reference in its entirety.

TECHNICAL FIELD

Embodiments presented in this disclosure generally relate to controlling a wireless network, and more specifically, to using a closed-loop system that includes a drone for expanding the capabilities of the wireless network in real-time.

BACKGROUND

A cell on wheels (COW) is a mobile cell site that includes a cellular antenna tower and an electronic radio transceiver on a truck or trailer. Generally, the COW is designed to be part of a cellular network typically on a temporary or short-term basis. COWs are used to provide expanded cellular network coverage and/or capacity for short-term demands, such as major sporting events (Super Bowl, World Series, Rose Bowl), major conventions, or in disaster areas where cellular coverage either is minimal, never present (e.g., in a wilderness area where firefighters have set up a command center during a major forest fire) or is compromised by the disaster.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Overview

One embodiment presented in this disclosure is a method that includes identifying, using a self-organizing network (SON), a performance issue at a geographic region within a cellular network comprising one or more fixed cell sites and configuring, using the SON, a drone access point (AP) to function as a mobile cell site for the cellular network, wherein the drone AP comprises an unmanned aerial vehicle (UAV). The method includes determining a desired location of the drone AP in the cellular network. Moreover, a coverage area of the drone AP when at the desired location includes at least a portion of the geographic region. The method includes dispatching the drone AP to the desired location.

Another embodiment described herein is a computing system that includes a computing processor and a SON. The SON is configured to identify a performance issue at a geographic region within a cellular network comprising one or more fixed cell sites and configure a drone AP to function as a mobile cell site for the cellular network, where the drone AP comprises a UAV. The SON is also configured to determine a desired location of the drone AP in the cellular network. Moreover, a coverage area of the drone AP when at the desired location includes at least a portion of the geographic region. The SON is configured to dispatch the drone AP to the desired location.

Another embodiment described herein is a communication system that includes a UAV and a SON. The SON is configured to identify a performance issue at a geographic region within a cellular network comprising one or more fixed cell sites and configure the UAV to function as a mobile cell site for the cellular network. The SON is also configured to determine a desired location of the drone AP in the cellular network. Moreover, a coverage area of the drone AP when at the desired location includes at least a portion of the geographic region. The SON is configured to dispatch the drone AP to the desired location.

Example Embodiments

Embodiments herein describe a system that includes an autonomous vehicle (referred to herein as a drone) which is controlled by a self-organizing network (SON) to expand the capabilities of a cellular network in real time. In one embodiment, the SON monitors the cellular network and identifies congestion or capacity issues in the network. For example, a sporting event may result in a large number of users congregating in a small geographic region (e.g., a stadium). The cell towers covering the geographic region may be unable to satisfy the large number of requests for data (e.g., phone calls, emails, internet traffic) by the users in the region. In another example, a natural disaster may disable or destroy a cell tower thereby limiting or eliminating the services which can be provided by the cellular network in a geographic region. Dispatching a cell-on-wheels (COW), however, requires planning and has very long response times before being operational. The embodiments herein use a drone to respond in real-time to performance issues arising in the cellular network.

Once a congestion or capacity issue is detected, the SON determines whether dispatching a drone access point (AP) (also referred to as a Cell on Drone) may improve or eliminate the issue. In one example, the drone AP is an unmanned aerial vehicle (UAV) that includes a radio that permits the drone to serve as a mobile cell site for the cellular network. That is, the drone AP can perform the same functions as a cell tower such as receiving user requests and providing requested data, but the drone is mobile. As such, the SON can move the drone APs to different geographic areas to expand or improve the cellular network. For example, as a crowd moves from the parking lot to a stadium, the SON can move the drone AP such that the majority of the crowd is within the range of its antenna.

In one embodiment, the SON provides RF parameters to both the drone AP and the neighboring cell towers which cover the same geographic region. In this way, the SON can optimize the RF parameters for these different cells to improve the overall performance of the cellular network at the geographic region. Moreover, the SON can monitor the cellular network to determine if the event causing the congestion or capacity issue has ended in which case the SON can instruct the drone AP to return to base and reconfigure the permanent cell sites in the region (e.g., the cell towers) to operate without assistance from the drone AP.

Figure 1:
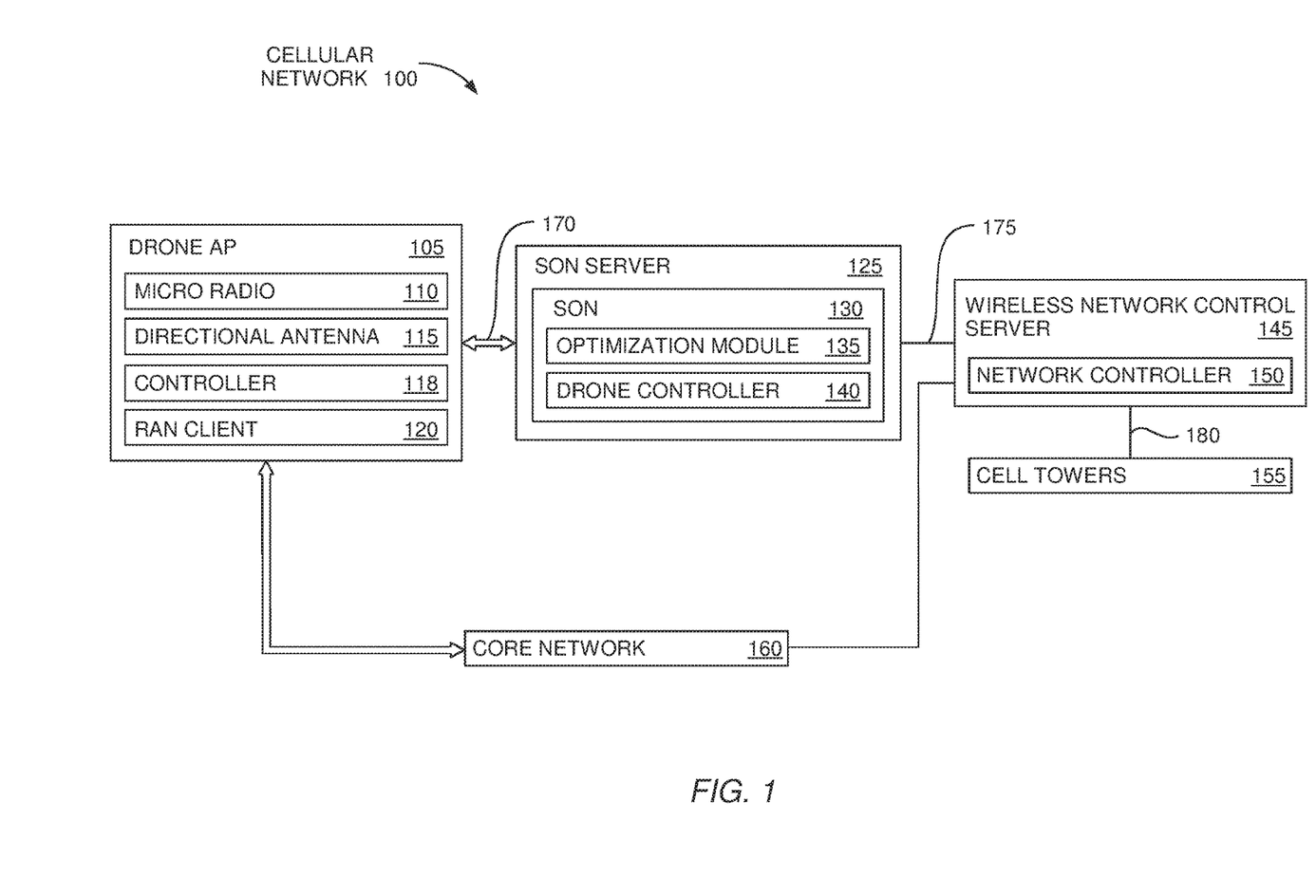
FIG. 1 is a block diagram of a closed-loop system for controlling drone access points in a wireless network, according to one embodiment described herein.

FIG. 1 is a block diagram of a cellular network 100 for controlling drone APs. The network 100 includes a drone AP 105, a SON server 125, a wireless network control server 145, cell towers 155, and a core network 160. The drone 105 may be any type of autonomous vehicle such as a unmanned aerial vehicle (UAV), driverless (or self-driving) car, tracked vehicle, or a vehicle that use bipedal or quadrupedal movement. In one embodiment, the drone 105 can be controlled either by an internal controller 118 or by an external system without receiving instructions from a human operator. However, in one embodiment, the drone 105 can be controlled by a human operator in the event of an emergency or if the internal and/or external controller systems fail. For example, as will be discussed in greater detail below, the drone 105 receives a predetermined path to traverse from the SON 130; however, if a human operator observing the drone 105 determines the drone 105 is about to collide with an object or is behaving erratically, the operator may override the internal controller 118 and safely navigate the drone 105. Thus, the embodiments herein do not require that the drone 105 always be operated without any human control.

The drone AP 105 includes a radio 110, a directional antenna 115, and a radio access network (RAN) client 120. The radio 110 may include a transmitter and a receiver for communicating with user devices (e.g., smart phones, tablets, laptops, and the like). For example, the radio 110 enables the drone 105 to function as an access point to the cellular network for the user devices. Using the radio 110, the user devices can perform such functions as initiate and receive phone calls, browse the internet, send and receive emails using the cellular network. In one embodiment, the drone AP 105 also uses the radio 110 to communicate with the core network 160. Although not shown, the core network 160 (e.g., a backplane or backhaul) is connected to other communication networks such as the internet or different cellular networks. In this manner, the drone AP 105 serves as a relay that transmits data between the user devices and the core network 160. In one embodiment, the drone AP 105 functions as a mobile cell site or mobile base station for the cellular network 100.

The directional antenna 115 defines a beam pattern that covers a specific geographic region in the cellular network 100. For example, the beam pattern may be configured to radiate the signals generated by the radio 110 downward in a direction towards the ground. Moreover, changing the elevation of the drone AP 105 may change the size and shape of the beam pattern of the directional antenna 115 at the ground. Furthermore, in response to instructions received from the SON server 125, the drone AP 105 may change the beam pattern of the antenna 115 to, for example, mitigate interference with the cell towers 155 or to adapt to different physical features on the ground such as hills, buildings, ravines, etc. which may negatively impact cell coverage.

The RAN client 120 facilitates communication between the drone AP 105 and the SON 130. For example, the RAN client 120 may receive a predetermined location and radio frequency (RF) configuration parameters from the SON 130, which are used to move drone AP 105 to the location. Using the RF configuration parameters, the RAN client 120 configures the radio 110, directional antenna 115, and controller 118. The RAN client 180 then relays RF data received or measured by the radio 110 to the SON 130. The RAN client 120 and the controller 118 may be software, hardware, or combinations thereof.

The SON server 125 (e.g., a computing system with one or more processors) includes the SON 130 which may include software, hardware, or combinations thereof for automatically controlling the drone AP 105 (i.e., without user input). Moreover, although FIG. 1 illustrates a centralized SON (C-SON) located on server 125, the SON 130 may be distributed across multiple servers 125 or computing devices (i.e., a distributed SON). For example, the SON 130 may be executed in a data center or cloud environment where multiple computing nodes are used to execute the functions described herein.

The SON 130 includes an optimization module 135 which automatically configures the cell towers 155 (e.g., base stations or access points) to optimize their coverage and capacity and minimize interference between the towers 155. For example, when a new cell tower 155 is powered on, the SON 130 recognizes the new tower and adjusts the RF parameters of the neighboring cell towers 155 to reach an optimal coverage and capacity. The SON 130 may also generate automatic neighbor relationships (ANR) between the cell towers 155 and/or provide self-healing algorithms for reducing negative impacts on the cellular network resulting from failures.

The optimization module 135 also considers the drones APs 105 when optimizing the coverage and capacity of the cell towers 155. That is, the optimization module 135 considers both the drone AP 105 and the cell towers 155 as base stations or cell sites in the cellular network 100, and thus, generates an optimal solution for maximizing the coverage of the cellular network 100 while minimizing interference between the cell sites. To do so, the optimization module 135 processes RF data received from the drone AP 105 and the cell towers 155 using one or more optimization algorithms used to identify and correct problems in the wireless network such as low signal strength, interference, failure to receive or transmit layer 1, 2, or 3 data messages or packets which may indicate there is a coverage or capacity issue in the cellular network 100.

Once a performance issue is identified, the optimization module 135 generates one or more actions for optimizing the wireless network to mitigate or resolve the problem. As discussed in more detail below, the optimization module 135 may determine that the issue can be ameliorated or resolved by dispatching the drone AP 105 to a specific geographic region. Moreover, if the drone AP 105 is already dispatched to an area and the RF data indicates that one of the cell towers 155 interferes with the radio 110 in the drone AP 105, the optimization module 135 may generate an instruction to reduce the output power of the cell tower 155 or change the physical orientation of the transmitting antenna of a tower

155 (e.g., tilt the antenna). Conversely, the optimization module 135 may instruct the controller 118 to reduce the transmission power of the radio 110 or move the drone AP 105 to a different location.

Stated generally, the algorithms used by the optimization module 135 select which parameter in the wireless network should be changed in order to mitigate the identified issue. Of course, the optimization module 135 may determine to change several parameters on multiple cell towers 155 and dispatched drone APs 105 in order to mitigate the capacity or coverage issues.

Using the communication link 175 (which may be a wired or wireless link), the optimization module 135 transmits the instructions to the wireless network control server 145 for execution. Specifically, the server 145 includes a network controller 150 which is communicatively coupled to the cell towers 155 via link (or links) 180. The network controller 150 carries out the instructions received from the optimization module 135 to change the parameter in the cellular network established by the cell towers 155. Although FIG. 1 illustrates cell towers 155, the cellular network 100 may include different types of transmitter and/or receivers such as repeaters, network devices, and the like. When attempting to resolve an identified issue, the optimization module 135 may change other parameters in the cellular network such as the location of the dispatched drone AP 105, bandwidth allocation amongst the towers 155, transmission frequency, handover protocols, and the like.

In addition to these functions, in one embodiment, the SON 130 controls the path traversed by the drone AP 105 as the drone 105 travels to its deployment location. To do so, the SON 130 includes a drone controller 140 which generates and maintains the path traversed by the drone 105 and its deployment location. The drone controller 140 may consider obstacles in the region such as man-made structures, road conditions, trees, topography, and the like when selecting the path of the drone 105 to its deployment location. Moreover, the drone controller 140 may indicate an altitude or height that the drone 105 should fly when traversing the path.

In addition to providing the path, the drone controller 140 may receive updates from the controller 118 on the drone AP 105 to determine if the drone 105 is following the path. If not, the drone controller 140 can send updated information to move the drone 105 into the desired location. As shown, the drone 105 and SON server 125 are communicatively coupled by wireless link 170.

Like the drone AP 105, the cell towers 155 are communicatively coupled to the core network 160. In this manner, any user devices communicatively coupled to the cell towers 155 can use the core network 160 to access other cellular networks or the internet in order to initiate or receive phone calls, browse the internet, access social media networks, and the like. Thus, cellular network 100 illustrates an example of using fixed cell sites (i.e., cell towers 155 or repeaters) and mobile cell sites (i.e., deployed drone AP 105) which are optimized using the SON 130 to improve the overall coverage and capacity of the cellular network 100.

Figure 2:
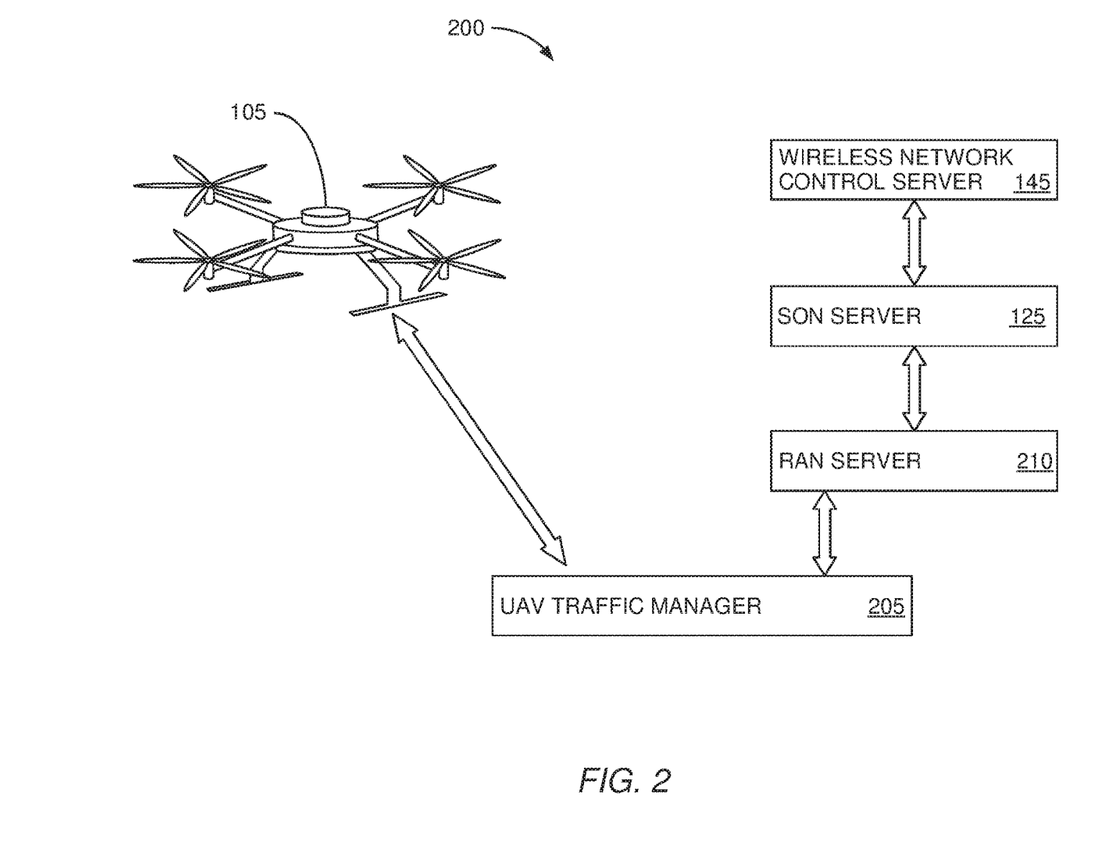
FIG. 2 illustrates a closed-loop system for controlling drone access points in a wireless network, according to one embodiment described herein.

FIG. 2 illustrates a closed-loop system 200 for deploying and controlling the drone AP 105, according to one embodiment described herein. In this example, the drone AP 105 is a UAV that may include one or more propellers for directing the flight path of the drone 105. Although not shown here, the drone 105 may include the radio 110, antenna 115, controller 118 (e.g., a flight controller), and the RAN client 120 as illustrated in FIG. 1.

The system 200 also includes a UAV traffic manager (UTM) 205 which serves as an intermediary between the RAN client on the drone AP 105 and a RAN server 210. That is, the UTM 205 routes RF data coverage and capacity information measured by the radio on the drone AP 105 to the RAN server 210 using a wireless connection. The UTM 205 also provides the flight path information generated by the SON server 125 to the drone 105. In addition, the UTM 205 may aid in the drone 105 in other tasks such as obstacle avoidance, weather conditions, monitoring internal systems, and the like.

The RAN server 210 provides connectivity between the UTM 205 and the SON server 125. For example, the RAN server 210 communicates with a RAN client executing on the drone 105. The RAN server 210 forwards RF data received from the RAN client to the SON server 125. As mentioned above, the SON server 125 processes the RF data to identify problems in the wireless network at the location at which the drone AP 105 is deployed. If a problem is found, the SON server 125 may generate one or more actions which are forwarded to the wireless network control server 145 and/or to the drone AP 105. The server 145 and drone AP 105 performs the requested action by changing a parameter in the wireless network—e.g., changing the orientation of an antenna in a cell tower or the location of the drone 105. In this manner, the drone AP 105 and the cell towers can be controlled to improve the performance of the cellular network.

Figure 3:
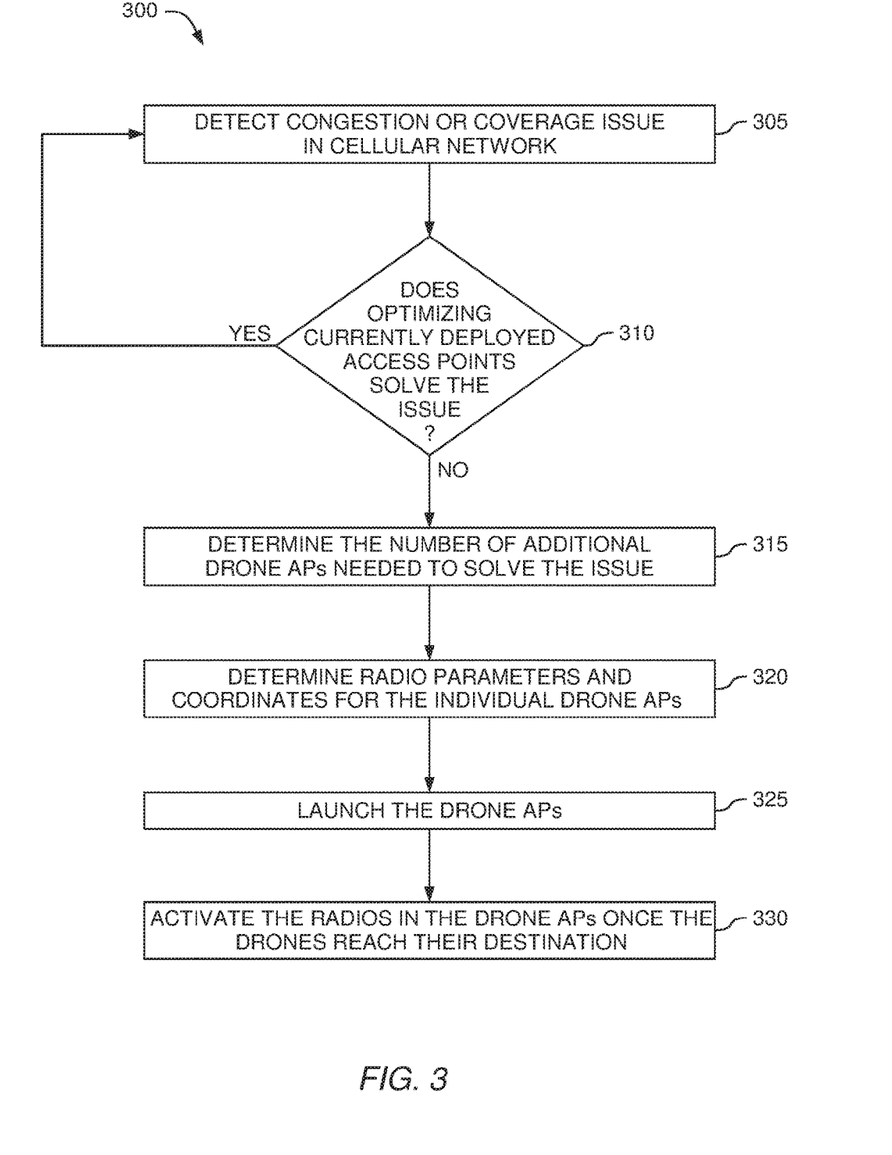
FIG. 3 is a flow chart for determining when to dispatch a drone access point, according to one embodiment described herein.

FIG. 3 is a flow chart illustrating a method 300 for determining when to dispatch a drone AP, according to one embodiment described herein. At block 305, the SON detects a congestion or coverage issue in the cellular network. In this example, the SON has not yet deployed a drone AP but instead relies solely on fixed cell sites (e.g., cell towers or repeaters) to service the user devices in the network. However, as a result of monitoring the fixed cell sites, the SON can identify coverage or congestion issues in a particular geographic region. For example, the SON may monitor performance indicators (also referred to as "key performance indicators" (KPI)) such as data transmission error rates, failed requests, bandwidth utilization, dropped calls, and the like. The SON can compare the performance indicators to respective congestion thresholds to determine if the cell sites are unable to satisfy user demand. That is, the SON determines if the fixed cell sites are unable to satisfy the requests made by user devices within the geographic regions serviced by the sites.

In one embodiment, the cellular network is divided into different zones where one or more cell sites provide coverage for the zones. The SON may monitor the performance indicators on a per zone basis in order to identify a particular geographic region with a performance issue. For example, a zone may include a live event such as a sporting event which causes the performance indicators to fall below the congestion thresholds. Moreover, the location of the live event (e.g., a stadium) may be subdivided into different zones. The SON can identify issues within each of the zones of the live event. As discussed below, the SON can adjust the currently deployed access points (or dispatch drone APs) to improve congestion or capacity issues within a particular zone.

Once an issue is identified, at block 310, the optimization module in the SON attempts to optimize the RF parameters in the currently deployed access points (e.g., the fixed cell sites) to solve the issue. For example, the optimization module may change the coverage areas of the cell towers such that an area previously covered by a first cell tower that is overloaded is now covered by a second cell tower which has available bandwidth. As a result, user devices previously communicating with the cellular network using the first cell tower now use the second cell tower. In another example, assuming multiple cell towers cover the same area, the SON may instruct a cell tower to hand off some of the user devices to a neighboring cell tower which has available bandwidth and covers the same area. In this manner, the optimization module attempts to rectify the issue by coordinating the functions of the different cell towers.

If the optimization module successfully optimizes the currently deployed access points to resolve the issue, method 300 returns to block 305 where the SON monitors the cellular network until another capacity or coverage issue is identified. However, if the optimization module was unable to resolve the issue (e.g., the performance indicators remain below the congestion thresholds), method 300 proceeds to block 315 where the SON determines the number of additional drone APs needed to solve the performance issue.

In one embodiment, the SON determines the extent of the issue and the number of additional radios needed to provide satisfactory service to the users within the specific geographic region. For example, the SON may estimate the number of user devices in the geographic region (based on how many unique user devices are attempting to communicate with the cell tower covering the region) and subtract this number from the capabilities of the cell towers covering the region. For example, if the SON estimates there are 20,000 user devices in a geographic region but the cell towers covering that region can only handle (on average) 15,000 user devices, the SON knows it should deploy enough drone APs to handle 5000 user devices. If the radio on each drone AP can handle 1000 user devices, the SON deploys five drone APs to the geographic region.

In another embodiment, the SON determines how many drone APs to dispatch based on the other factors such as available bandwidth, frequency of errors (e.g., dropped packets), congestion factors, and the like. The optimization module in the SON can evaluate these factors and estimate the number of radios needed to resolve the issue by improving the performance indicators such that the indicators exceed a predefined threshold.

At block 320, the optimization module in the SON determines the radio parameters and coordinates for each of the drone APs. In one embodiment, when determining the radio parameters, the SON considers the effect of the radio in the drone AP on the currently deployed access points covering the geographic region. For example, the SON may adjust the RF parameters of the cell towers once the drone AP reaches the geographic region and its radio is activated.

The radio parameters of the drone AP may include the power of the transmitter, directionality of the antenna, physical cell identifiers (PCI) assuming the cellular network is a Long Term Evolution (LTE) network, pulse code modulation (PCM) values assuming the cellular network is a Universal Mobile Telecommunications System (UMTS), and the like. Generally, the radio parameters configure the drone AP to function as a cell site in the cellular network and perform the same functions as the fixed cell sites—e.g., the cell towers. Although the drone APs perform a similar function as the cell towers, their coverage areas may be smaller.

The optimization module also provides the coordinates of a location where the drone APs should be deployed in the cellular network. These coordinates may include both a location on the surface of the earth (e.g., a latitude and longitude) as well as an elevation the drone AP should hover.

As mentioned above, the location of the drone AP affects its coverage area; thus, the optimization module may choose the elevation and location of the drone AP after considering how the resulting coverage area would affect the already deployed access points. For example, the coverage area of the drone AP may overlap the coverage area of a cell tower. The optimization module may set the coordinates of the drone AP and its radio parameters to minimize interference between the drone AP and the cell tower.

In one embodiment, the drone controller in the SON generates a path for the drone AP to fly to reach the coordinates generated by the optimization module. The drone controller may consider such things as buildings, terrain, power lines, trees, densely populated areas, and the like to generate a flight path between the home base of the drone and the coordinates. The drone controller may provide continuously flight information to the flight controller in the drone AP in order to guide the drone to the desired coordinates or upload the flight path to the drone and permit the internal flight controller to guide the drone AP to the coordinates.

At block 325, the SON launches one or more drone APs. In one embodiment, the SON transmits an instruction to the UTM which, in turn, instructs the drone AP to leave its home base and fly to the coordinates provided by the SON. The UTM or the drone controller in the SON may constantly monitor the positions of the drone AP to ensure the drone travels along the desired flight path.

At block 330, the SON activates the radio in the drone AP once the drone reached its destination. For example, the SON may wait until the drone controller or the UTM determines the drone AP has reached the coordinates determined by the optimization module. Advantageously, waiting until the drone reaches the coordinates before activating its radio prevents the drone AP from interfering with other cell sites as the drone moves through the cellular network. That is, the SON may not consider the effects of an active cell site moving through the cellular network which can cause unexpected interference, and as such, maintains the radio on the drone AP in an inactive state until the drone reaches its destination.

Figure 4:
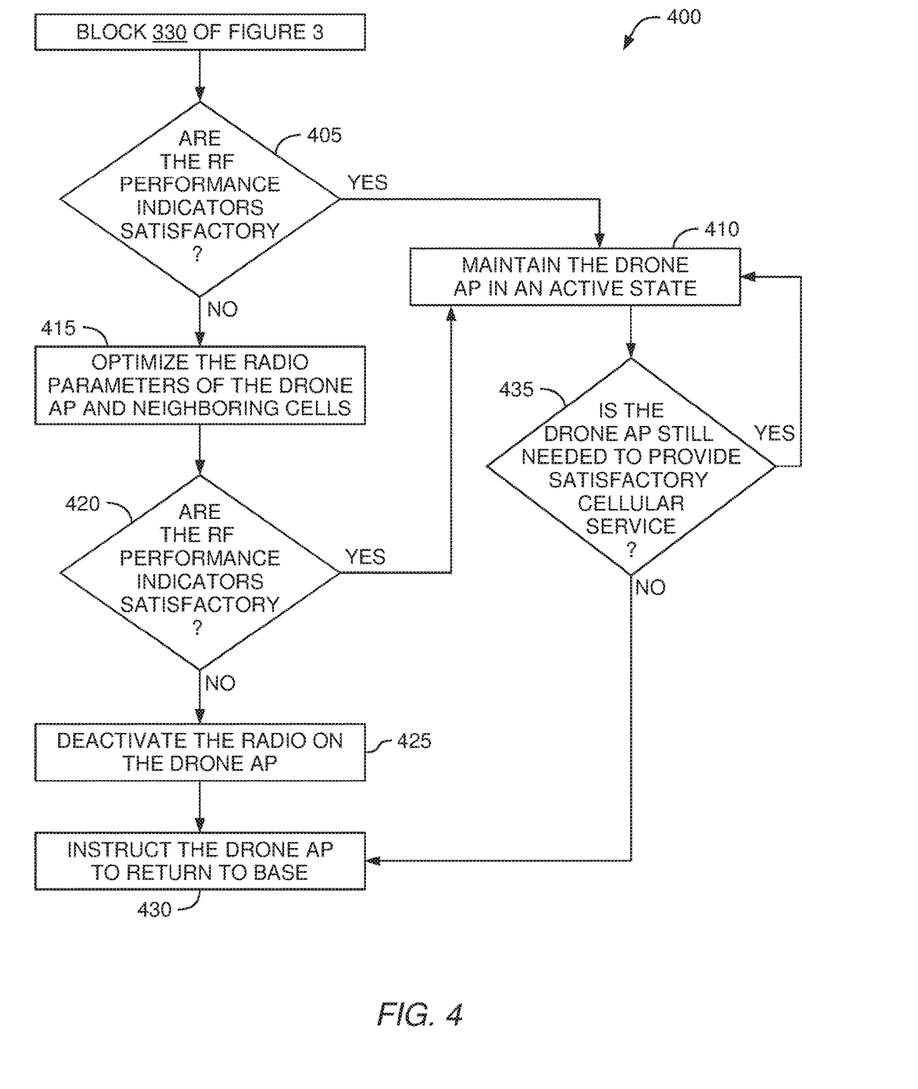
FIG. 4 is a flow chart for controlling RF parameters in a wireless network using the drone access point, according to one embodiment described herein.

FIG. 4 is a flow chart of a method 400 for controlling RF parameters in a wireless network using the drone AP, according to one embodiment described herein. Method 400 begins at block 330 of FIG. 3 when the SON activates the radio in the drone AP. At block 405, the SON monitors RF performance indicators for the geographic region (or zone) the drone AP covers to determine if the indicators are satisfactory. Put differently, the SON determines whether the drone AP improves the performance indicators (e.g., the KPIs) relative to when the drone AP was not dispatched. In one embodiment, even if dispatching the drone AP improves the performance indicators, the SON may determine if the drone AP has improved the indicators such that they are now above the congestion thresholds. For example, without the drone, the dropped packet rate for the geographic region may be 15%. With the drone, the dropped packet rate may improve to 10%; however, the SON may deem the cell service as being adequate or satisfactory only when the dropped packet rate is less than 5%.

To determine if the performance indicators are satisfactory, the SON monitors the network traffic flowing through the drone AP as well as the other cell sites (e.g., cell towers) that cover the same geographic region or zone as the drone AP. For example, the SON may monitor the data transmission error rates, failed requests (dropped packets), bandwidth utilization, dropped calls, etc. corresponding to the cell sites. Moreover, the cell sites may send other data to the SON such as CPU utilization, memory utilization, the number of user devices currently communicating with the site, and the like which the SON can use to determine if the performance indicators are satisfactory.

Assuming the performance parameters are satisfactory, method 400 proceeds to block 410 where the SON maintains the drone AP in an active state. Put differently, the radio on the drone AP continues to operate using the radio parameters the drone originally received from the optimization module during method 300. Moreover, the drone AP continues to hover at the coordinates originally provided.

However, if the performance parameters are unsatisfactory, method 400 proceeds to block 415 where the optimization module in the SON attempts to optimize the radio parameters of the drone AP and neighboring cells. That is, the original radio parameters provided by the SON do not satisfy the capacity/congestion issue, and as a result, the optimization module again tries to identify radio parameters for the drone AP and the neighboring cells (e.g., cell towers covering the same area or zone as the drone AP) which resolve the issue. For example, the terrain of the live event may cause unexpected interference between the drone AP and the neighboring cells, or the weather conditions at the location may have changed the expected coverage area of the drone AP. Regardless of the reason, the optimization module can perform the same or similar algorithms discussed in block 320 of method 300 to determine radio parameters for the drone AP and the neighboring cells that resolve the issue.

In addition to changing the radio parameters for the drone AP, the optimization module may also change its coordinates. For example, the optimization module may reduce the height of the drone thereby reducing the size of its coverage area but improving the signal strength within that area. Alternatively, the SON may move the drone (e.g., changes its latitude and longitudinal coordinates) so that its coverage area overlaps more with the coverage area of one of its neighboring cells but less with another neighboring cell. For example, the users in the crowd at an event may move from the parking lot to a stadium. At first, the SON positions the drone to cover the parking lot (e.g., a first zone) but after the people move, the SON determines that the performance indicators for a second zone that includes the stadium have fallen below the congestion thresholds. In response, the SON moves the location of the drone AP so that its coverage area includes the second zone.

At block 420, the SON determines if the new radio parameters for the drone AP and/or the neighboring cell sites satisfy the performance indicators—i.e., resolve the issue detected at block 305 of method 300. If so, method 400 proceeds to block 410. If not, method 400 proceeds to block 425 and deactivates the radio on the drone AP. That is, if the drone AP does not improve or help to resolve the issue, the SON turns off its radio and at block 430 instructs the drone to return to its home base. Although not shown in method 400, once the radio on the drone AP is deactivated, the optimization module may update the radio parameters of the neighboring cell sites to compensate for the removal of the drone AP. That is, the radio parameters of the cell towers may be different when the drone AP is activated than when the drone AP is deactivated.

However, assuming that adding the drone AP to the cellular network does satisfy the performance indicators, the SON maintains the drone AP in the activate state at its current location until determining at block 435 that the drone AP is no longer needed to provide satisfactory cellular service at the location. For example, if the live event is over and the number of user in the geographic region decreases, the SON can determine that the drone AP is no longer needed to provide satisfactory service. For instance, if the number of user devices communicating with the cell sites can be serviced by using only the fixed cell sites (e.g., the cell towers), method 400 proceeds to block 430 where the SON instructs the drone AP to return to its home base. In one embodiment, the SON monitors the same performance indicators used to identify the congestion or capacity issue to determine when the issue is resolved at block 435. For example, if the bandwidth utilization of the cell sites falls below 50% or the dropped packet rate is below 1%, the SON determines the issue has been resolved and the drone AP is no longer needed.

Figure 5:
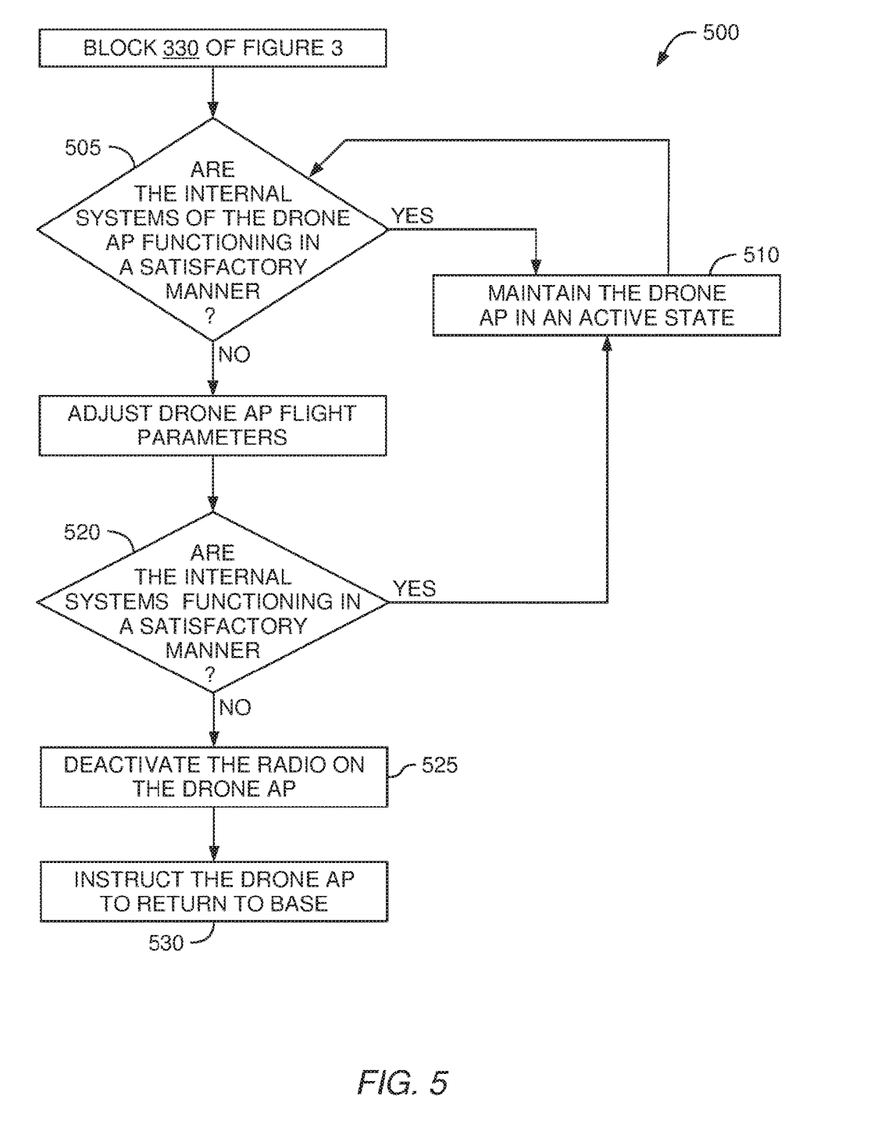
FIG. 5 is a flow chart for monitoring the internal operations of the drone access point, according to one embodiment described herein.

FIG. 5 is a flow chart of a method 500 for monitoring the internal operations of the drone AP, according to one embodiment described herein. Method 500 begins at block 330 of FIG. 3 when the SON activates a radio in a drone AP. At block 505, the drone controller in the SON monitors the internal systems of the drone AP to determine if these systems are functioning properly. For example, the drone controller may monitor the available battery power to ensure the drone has enough power to continue safe operation. The drone controller may also monitor flight control systems such as the status of the propellers or its ability to hover at a stationary position.

If the internal systems are performing satisfactory, method 400 proceeds to block 510 where the SON maintains the drone AP in an active state—i.e., the drone contains to operate as an AP or cell site for the cellular network. However, if there is a problem with one of the internal systems, method 400 proceeds to block 515 where the drone controller in the SON or the internal controller in the drone adjusts the flight parameters. For example, if one propeller is not behaving abnormally, the drone controller can instruct the other propellers to compensate. In another example, if the battery power is depleting at a rapid rate, the controller may shut down non-essential systems which may preserve the battery and permit the drone AP to continue to operate as a cell site.

At block 520, the drone controller determines if the adjustments to the flight parameters cause the internal systems to function in a satisfactory manner. That is, the drone controller determines whether the drone AP can continue to function as a cell site or whether the drone should return to its home base. To determine if the internal system is functioning properly, the drone controller may consider safety issues where the drone may be functioning properly at the moment, but continuing to operate the drone as a cell site increases the risk the drone may become a safety hazard in the future. If the internal system is not functioning in a satisfactory manner after the adjustments are made, at block 525, the SON deactivates the radio on the drone AP and instructs the drone AP to return to its home base at block 530.

In the preceding, reference is made to embodiments presented in this disclosure. However, the scope of the present disclosure is not limited to specific described embodiments. Instead, any combination of the features and elements herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer readable storage medium (or media) having computer readable program instructions thereon for causing a processor to carry out aspects of the present invention.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
identifying, using a self-organizing network (SON), a performance issue at a geographic region within a cellular network comprising one or more fixed cell sites;
configuring, using the SON, a drone access point (AP) to function as a mobile cell site for the cellular network, wherein the drone AP comprises an unmanned aerial vehicle (UAV), and wherein configuring the drone AP comprises:
generating radio parameters for a radio attached to the drone AP; and
adjusting radio parameters of at least one the fixed cell sites covering the geographic region to compensate for adding the drone AP to the cellular network;
determining a desired location of the drone AP in the cellular network, wherein a coverage area of the drone AP when at the desired location includes at least a portion of the geographic region; and
dispatching the drone AP to the desired location.

2. The method of claim 1, further comprising:
upon determining the drone AP has reached the desired location, activating the radio attached to the drone AP, wherein the radio is configured to function as the mobile cell site for the cellular network.

3. The method of claim 2, further comprising:
after activating the radio, measuring performance indicators corresponding to the geographic region of the cellular network, and
upon determining the performance indicators do not satisfy a congestion threshold, adjusting radio parameters of the radio and at least one of the fixed cell sites covering the geographic region using the SON.

4. The method of claim 1, further comprising:
before launching the drone AP, evaluating performance parameters corresponding to the geographic region to determine a number of drone APs to dispatch.

5. The method of claim 1, further comprising:
after launching the drone AP, evaluating performance parameters corresponding to the geographic region; and
upon determining based on the performance parameters that the performance issue has been resolved, instructing the drone AP to cease operating as the mobile cell site and return to a home base.

6. The method of claim 1, wherein the cellular network comprises a plurality of cell towers, wherein at least one of the cell towers provides coverage to the geographic region, and
wherein the performance issue is based on the at least one cell tower not being able to satisfactory provide wireless service, based on one or more thresholds, to user devices located within the geographic region.

7. The method of claim 1, wherein adjusting the radio parameters of the at least one the fixed cell sites to compensate for adding the drone AP to the cellular network comprises:
adjusting at least one of an output power of a transmitting antenna and a physical orientation of the transmitting antenna in the at least one fixed cell sites to compensate for adding the drone AP to the cellular network.

8. The method of claim 1, further comprising:
before dispatching the drone AP to the desired location, attempting to optimize RF parameters of the one or more fixed cell sites using the SON to resolve the performance issue without dispatching the drone AP.

9. The method of claim 8, wherein the drone AP is dispatched after the SON determines that optimizing the RF parameters did not resolve the performance issue.

10. A computing system, comprising:
a computing processor; and
a SON configured to:
identify a performance issue at a geographic region within a cellular network comprising one or more fixed cell sites,
configure a drone AP to function as a mobile cell site for the cellular network, wherein the drone AP comprises a UAV, wherein configuring the drone AP comprises:
generating radio parameters for a radio attached to the drone AP, and
adjusting radio parameters of at least one the fixed cell sites covering the geographic region to compensate for adding the drone AP to the cellular network,
determine a desired location of the drone AP in the cellular network, wherein a coverage area of the drone AP when at the desired location includes at least a portion of the geographic region, and
dispatch the drone AP to the desired location.

11. The computing system of claim 10, wherein the SON is configured to:
upon determining the drone AP has reached the desired location, activate the radio attached to the drone AP, wherein the radio is configured to function as the mobile cell site for the cellular network.

12. The computing system of claim 11, wherein the SON is configured to:
after activating the radio, measure performance indicators corresponding to the geographic region of the cellular network, and
upon determining the performance indicators do not satisfy a congestion threshold, adjust radio parameters of the radio and at least one of the fixed cell sites covering the geographic region.

13. The computing system of claim 10, wherein the SON is configured to:
before launching the drone AP, evaluate performance parameters corresponding to the geographic region to determine a number of drone APs to dispatch.

14. The computing system of claim 10, wherein the SON is configured to:
after launching the drone AP, evaluate performance parameters corresponding to the geographic region; and
upon determining based on the performance parameters that the performance issue has been resolved, instruct the drone AP to cease operating as the mobile cell site and return to a home base.

15. The computing system of claim 10, wherein the cellular network comprises a plurality of cell towers, wherein at least one of the cell towers provides coverage to the geographic region, and
wherein the performance issue is based on the at least one cell tower not being able to satisfactory provide cellular service, based on one or more thresholds, to user devices located within the geographic region.

16. A communication system, comprising:
a UAV; and
a SON configured to:
identify a performance issue at a geographic region within a cellular network comprising one or more fixed cell sites, configure the UAV to function as a mobile cell site for the cellular network, wherein configuring the UAV comprises:
 generating radio parameters for a radio attached to the UAV, and
 adjusting radio parameters of at least one the fixed cell sites covering the geographic region to compensate for adding the UAV to the cellular network,
determine a desired location of the UAV in the cellular network, wherein a coverage area of the UAV when at the desired location includes at least a portion of the geographic region, and
dispatch the UAV to the desired location.

17. The communication system of claim 16, wherein the SON is configured to:
 upon determining the UAV has reached the desired location, activate the radio attached to the UAV, wherein the radio is configured to function as the mobile cell site for the cellular network.

18. The communication system of claim 17, wherein the SON is configured to:
 after activating the radio, measure performance indicators corresponding to the geographic region of the cellular network, and
 upon determining the performance indicators do not satisfy a congestion threshold, adjust radio parameters of the radio and at least one of the fixed cell sites covering the geographic region.

19. The communication system of claim 16, wherein the SON is configured to:
 after launching the UAV, evaluate performance parameters corresponding to the geographic region; and
 upon determining based on the performance parameters that the performance issue has been resolved, instruct the UAV to cease operating as the mobile cell site and return to a home base.

20. The communication system of claim 16, wherein the cellular network comprises a plurality of cell towers, wherein at least one of the cell towers provides coverage to the geographic region, and
 wherein the performance issue is based on the at least one cell tower not being able to satisfactory provide cellular service, based on one or more thresholds, to user devices located within the geographic region.

* * * * *

UNITED STATES PATENT AND TRADEMARK OFFICE
CERTIFICATE OF CORRECTION

PATENT NO. : 9,854,408 B2
APPLICATION NO. : 15/046691
DATED : December 26, 2017
INVENTOR(S) : Om Prakash Suthar et al.

Page 1 of 1

It is certified that error appears in the above-identified patent and that said Letters Patent is hereby corrected as shown below:

On the Title Page

In item (54), and in the Specification, in Column 1, Line 2, in "Title", delete "DRONEAP" and insert -- DRONE AP --, therefor.

On the page 2, in Column 2, under "Other Publications", Lines 28-29, delete "Netowrking" and insert -- Networking --, therefor.

Signed and Sealed this
Tenth Day of April, 2018

Andrei Iancu
*Director of the United States Patent and Trademark Office*